INVENTORS.
ERNO H. ROSS,
EDWARD J. BAXA,
BY
Robert H. Hines
ATTORNEY.

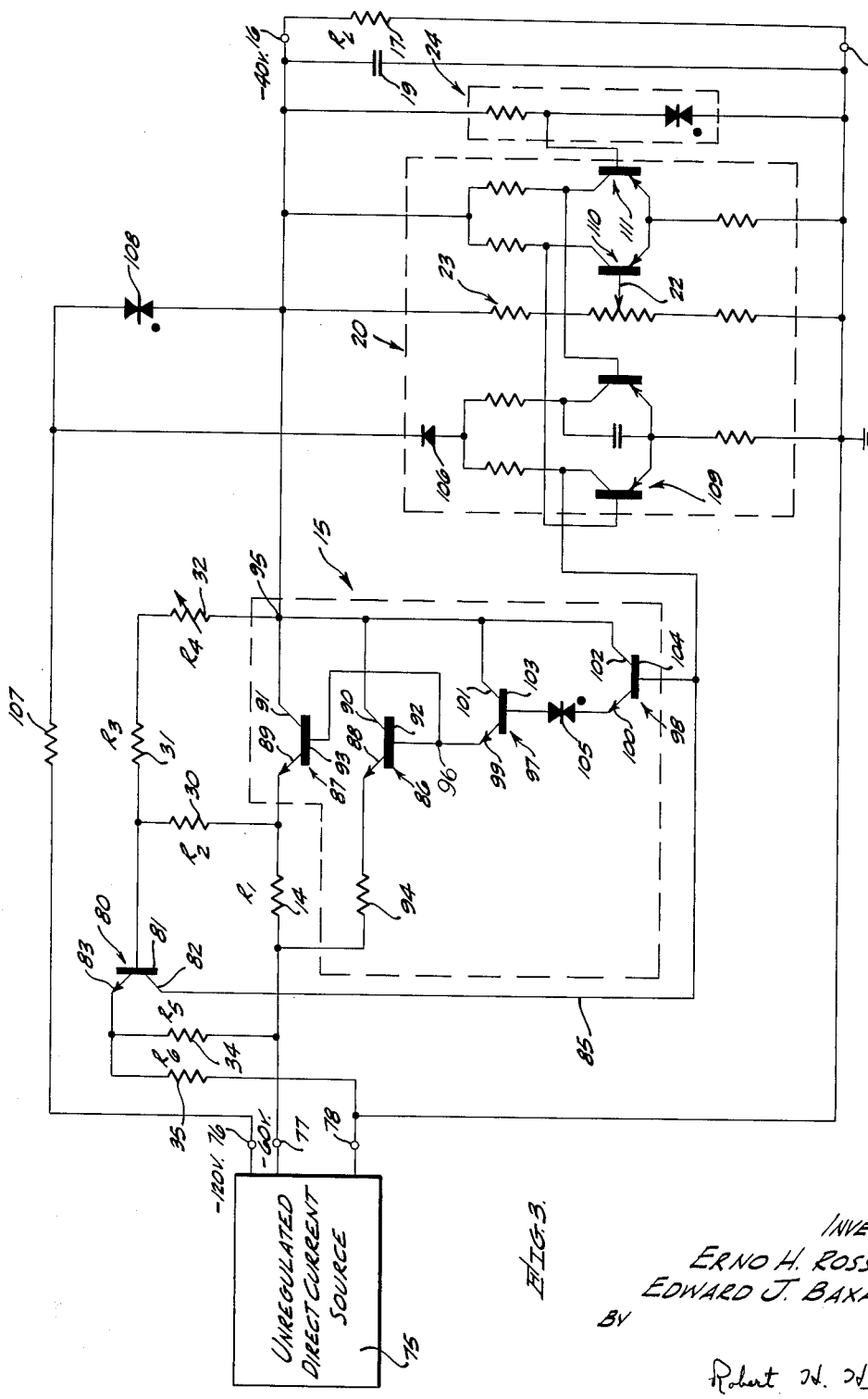

3,201,680
REGULATED TRANSISTOR POWER SUPPLY WITH AUTOMATIC SHUTOFF

Erno H. Ross, Anaheim, Calif., and Edward J. Baxa, Manitowoc, Wis., assignors to Hughes Aircraft Company, Culver City, Calif., a corporation of Delaware
Filed Dec. 6, 1960, Ser. No. 75,068
3 Claims. (Cl. 323—9)

This invention relates to a transistor power supply incorporating apparatus which automatically stops the flow of current when less than a predetermined impedance loads the supply. This condition persists indefinitely until the load impedance increases to an impedance that is greater than the predetermined load impedance at which time the supply automatically resumes normal output voltage.

Currently available apparatus for protecting against overcurrents include fuses, circuit breakers, overcurrent relays and switching networks which generally involve two or more transistors and/or diodes. These apparatuses, however, almost invariably require that either an element be replaced or a reset button be reset in order to bring the voltage back on. In some types of automatic equipment wherein the absence of voltage, for example, initiates switching from a defective channel to a substitute channel, the aforementioned requirements impose severe limitations. Also, some contemporary apparatauses operate too slowly to adequately protect the high speed transistors presently available and may even allow high currents at reduced voltages to flow, thus not giving adequate protection to the load.

It is an object of the present invention to provide a regulated transistor power supply having an improved overload protection network.

Another object of the present invention is to provide a regulated transistor power supply having overload protection apparatus incorporated therein which will cut off current flow through a load impedance only during intervals wherein an overload current would flow.

Still another object of the present invention is to provide a regulated transistor power supply incorporating automatic overload current protection and employing silicon power transistors for either a positive or negative polarity regulated output voltage.

The apparatus of the present invention operates in conjunction with a regulated power supply having a series transistor regulator and a difference amplifier for controlling the flow of current therethrough. In accordance with the present invention, an overload transistor is employed which affects the current flow to the difference amplifier in a manner such that current flow through the series transistor regulator is switched off when an overload current would flow. The overload transistor senses a current overload by means of a small resistor placed in series with the series transistor regulator. Once a current overload is sensed, the state of the overload transistor is changed and a resistor dividing network which includes a leakage path through the load impedance keeps the overload transistor in this changed state so long as an overload current would flow if voltage were applied across the load impedance. That is, current is not allowed to flow again through the series transistor regulator until the impedance of the load is increased to a predetermined level.

The above-mentioned and other features and objects of this invention and the manner of obtaining them will become more apparent by reference to the following description taken in conjunction with the accompanying drawings, wherein:

FIG. 3 shows a schematic circuit diagram of an embodiment of the invention using silicon power transistors and adapted to provide a regulated output voltage of negative polarity.

Figure 1:
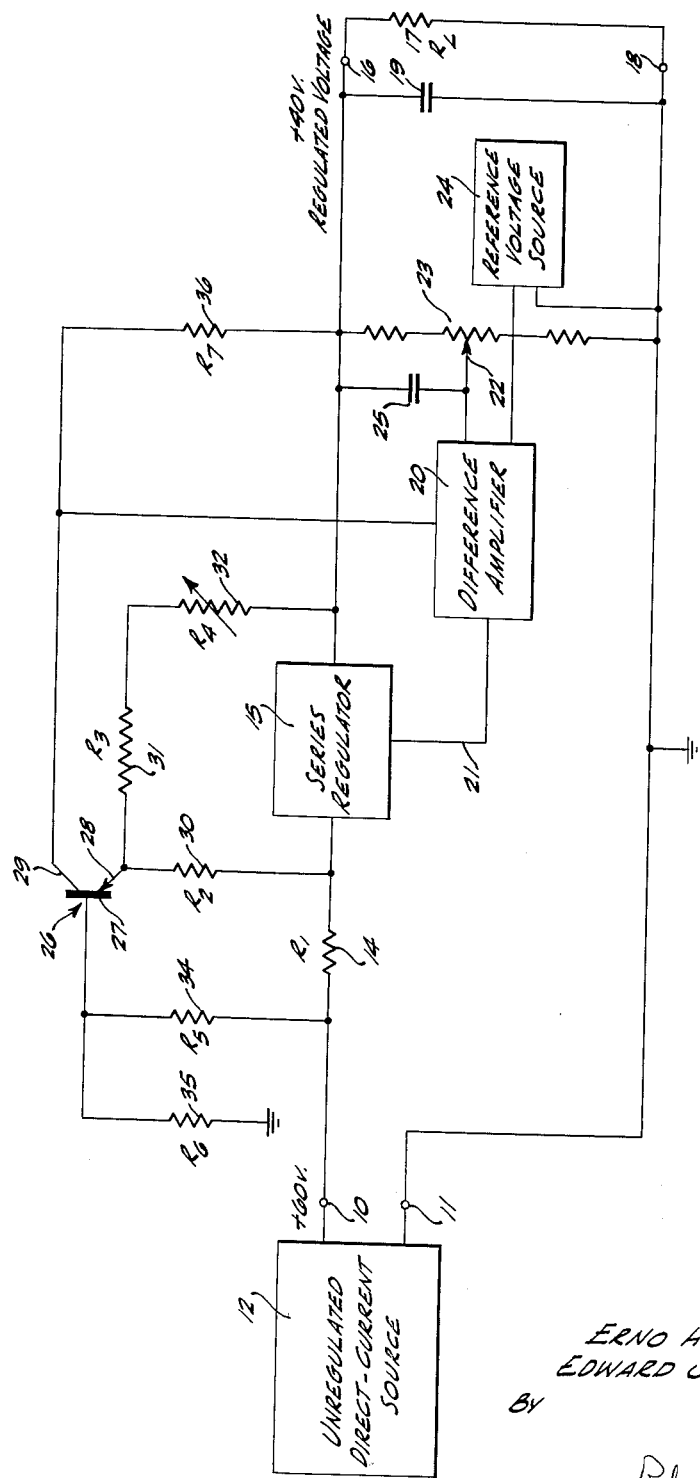
FIG. 1 illustrates a schematic block diagram of a preferred embodiment of the invention.

Referring now to FIG. 1 of the drawings, a preferred embodiment of the present invention comprises input terminals 10, 11, responsive to the output terminals of an unregulated direct-current source 12. The terminal 11 is connected to ground and the unregulated direct-current source 12 provides a voltage which is of the order of +60 volts D.C. relative to ground. The terminal 10 is connected through a current sensing resistor 14 of resistance $R_1$ to a series regulator 15, the output of which is connected to an output terminal 16. An output load resistor 17 of resistance $R_L$ is intended to be connected from the output terminal 16 to a second output terminal 18, which terminal 18 is also connected to ground. Also, a smoothing capacitor 19 is connected across the output terminals 16, 18.

Current flow through the series regulator 15 is controlled by means of a control voltage developed by a difference amplifier 20 and applied to regulator 15 over a lead 21. Difference amplifier 20 is responsive to the voltage available at an adjustable tap 22 of a resistor dividing network 23 connected between output terminals 16, 18 and to a reference voltage provided by a reference voltage source 24, which source 24 is referenced to ground. A capacitor 25 may be connected directly from output terminal 16 to the adjustable tap 22 of resistor dividing network 23 if it is desired to increase the amplitude of higher frequency signal variations at the input of difference amplifier 20. In addition to the foregoing, the difference amplifier 20 receives current through an overload transistor 26. Transistor 26 may be of a type 2N1275, for example, and includes a base 27, an emitter 28 and a collector 29. The emitter 28 of transistor 26 is connected through a resistor 30 of resistance $R_2$ ohms to the junction between current sensing resistor 14 and series regulator 15 and, in addition, is connected serially through a resistor 31 and an adjustable resistor 32 of resistances $R_3$ and $R_4$ ohms, respectively, to the output of series regulator 15. Further, the base 27 of transistor 26 is connected through a resistor 34 of resistance $R_5$ ohms to the input terminal 10 and through a resistor 35 of resistance $R_6$ ohms to ground. Lastly, the collector 29 of transistor 26 is connected through a resistor 36 of resistance $R_7$ to the output terminal 16 thereby to provide current for the difference amplifier 20 and thus be capable of switching it on or off. In general, the resistances $R_1$–$R_7$ may have approximately the following ohmic values:

| | |
|---|---|
| $R_1$ | 1.6 ohms. |
| $R_2$ | 47 Do. |
| $R_3$ | 500 Do. |
| $R_4$ | Adjustable from 0 to 250 ohms. |
| $R_5$ | 150 ohms. |
| $R_6$ | 1,600 Do. |
| $R_7$ | 2,200 Do. |

The exact ohmic values of the resistances $R_1$–$R_7$ are necessarily dependent upon the characteristics of the series regulator 15 and of the overload transistor 26. In particular, the resistances $R_5$ and $R_6$ of resistors 34, 35, respectively, form a resistor dividing network which provides proper bias for the overload transsitor 26 during normal operating conditions. During normal operating conditions, the emitter 28 of transistor 26 is maintained substantially at the potential of input terminal 10 in that the voltage drop across the resistance $R_1$ of resistor 14 is only nominal. Also, there is only a comparatively small "trickle current" flow through resistors 30, 31 and 32 during normal operation in that only the voltage drop across series regulator 15 is applied thereacross. During normal operation, the difference amplifier 20 senses variations in the output voltage by means of resistor divider network 23 and compares these variations to the reference voltage generated by reference voltage source 24 and develops a control voltage which is applied over lead 21 to the series regulator 15 thereby minimizing variations in output voltage.

Transistor 26 senses overcurrents by detecting the voltage drop across the resistor 14; that is, when currents get sufficiently high, the voltage drop due to resistance $R_1$ of resistor 14 becomes sufficiently large so as to bias the transistor 26 from a saturated condition to an open condition. This change from "saturated" condition to "open" condition takes place sufficiently fast to prevent current flowing through series regulator 15 from exceeding the initial overload trigger point, in that the "open" condition of transistor 26 turns off the current flow to the difference amplifier 20 which, in turn, turns off the control voltage applied over lead 21 to the series regulator 15. Further, when transistor 26 opens, the "trickle current" through "keep-off" resistors 30, 31, 32 of resistances $R_2$, $R_3$, $R_4$, respectively, and resistor 17 of resistance $R_L$ increases to approximately 100 milliamps. The resistors 30, 31, 32 and 17 form a resistor dividing network which biases the transistor 26 in a manner to keep it "open" so long as the resistance $R_L$ of resistor 17 remains below a predetermined value which corresponds to the initial overload current. Ths value is determined by the selection of resistors 14, 30, 31, 32, 34 and 35 and may be set more precisely by adjusting resistance $R_4$ of resistor 32. It is to be noted that the difference amplifier 20 operates from current provided by the transistor 26. It is thus possible that at elevated temperatures leakage current from transistor 26 may become sufficiently high so as to cause the difference amplifier 20 to function and turn the voltage supply on while an overload condition still persists. In order to avoid this possibility, the resistor 36 of resistance $R_7$ is connected in a manner to form a divider with the open impedance of transistor 26 during overload conditions so that leakage current cannot turn the supply on.

Figure 2:
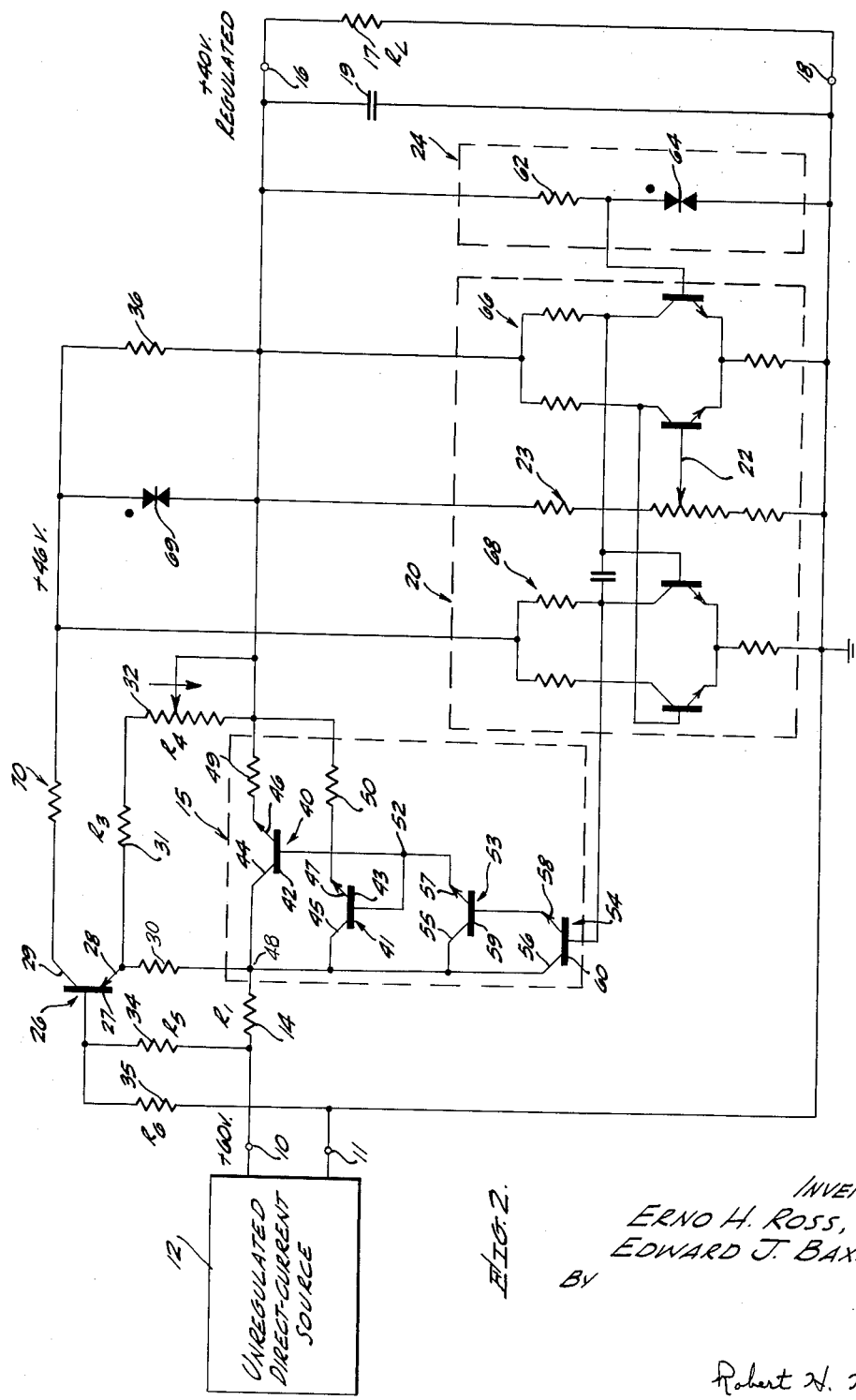
FIG. 2 shows a schematic circuit diagram of the embodiment of the invention shown in FIG. 1 using silicon power transistors and adapted to provide a regulated output voltage of positive polarity.

Referring now to FIG. 2, there is shown a schematic circuit diagram of a specific embodiment of the apparatus of FIG. 1 wherein like reference numerals refer to apparatus or elements having similar functions. In particular, series regulator 15 includes transistors 40, 41 having bases 42, 43, collectors 44, 45 and emitters 46, 47, respectively. The collectors 44, 45 are connected to a common junction 48, which junction 48 is, in turn, connected to the junction intermediate resistors 14 and 30; the emitters 46, 47 are connected through resistors 49, 50, respectively, to the output terminal 16 of the supply; and the bases 42, 43 are both connected to a common junction 52. In addition to the foregoing, the regulator 15 includes transistors 53, 54 having collectors 55, 56, emitters 57, 58 and bases 59, 60, respectively, the collectors 55, 56 both being connected to the common junction 48. The emitter 57 of transistor 53 is connected to the junction 52 and the base 59 thereof connected to the emitter 58 of transistor 54. Lastly, the base 60 of transistor 54 is connected to the lead 21 from difference amplifier 20. The transistors 40, 41, 53, 54 are preferably n-p-n silicon power transistors of a type known commercially as 2N424. The transistors 40, 41 are connected in parallel and the resistors 49, 50 are of low ohmic value and function to effect an even distribution of current flow through the transistors 40, 41. The transistors 53, 54, on the other hand, provide current amplification of the signal appearing at the base 60 of transistor 54.

Next, the reference voltage source 24 includes a resistor 62 and a Zener diode 64 serially connected in the order named from output terminal 16 to output terminal 18. The resistor 62 has sufficient ohmic value to provide a voltage drop for the Zener diode 64 which functions as a reference element. This resistance may be of the order of 3,300 ohms. A Zener diode of the type known commercially as 1N430A may be employed, in which case the junction between resistor 62 and Zener diode 64 provides a voltage reference of 8.4 volts. The signals available at this junction and at the adjustable tap 22 of the resistor dividing network 23 are applied to the inputs of the difference amplifier 20. The difference amplifier 20 includes a first input stage 66 and an output stage 68, both of which may be of conventional design. In accordance with the present invention, however, current for the output stage 68 of difference amplifier 20 is provided by a connection from the overload transistor 26. In order to further improve the ability of the present apparatus to provide a stabilized regulated output voltage, however, a Zener diode 69 is connected in parallel with the resistor 36 and a resistor 70 interposed between the collector 29 of the overload transistor 26 and the resistor 36. Zener diode 69 may be of the type known commercially as 1N429, in which case the voltage applied to the output stage 68 of difference amplifier 20 is stabilized at 6 volts positive relative to the voltage available at the output terminal 16 during normal operation of the apparatus. The overall operation of the device of FIG. 2 is the same as described for the device of FIG. 1.

During operation of the device of FIG. 2, the voltages available during normal and overload conditions are as follows:

|  | Normal Condition, volts | Overload Condition, volts |
| --- | --- | --- |
| Input Terminal 10 | 60 | 60 |
| Input Terminal 11 | 0 | 0 |
| Junction 48 | 58.5 | 60 |
| Base 27 of Transistor 26 | 55 | 54.5 |
| Collector 29 of Transistor 26 | 58 | 0 |
| Junction between Resistors 36, 70 | 46 | 0 |
| Output terminal 16 | 40 | 0 |
| Lead 21 | 43.5 | 0 |

Referring to FIG. 3, there is illustrated a schematic circuit diagram of the embodiment of the present invention adapted to produce a regulated output voltage of negative polarity. It is apparent that the device of FIG. 2 could be converted from positive to negative polarity output voltage by substituting p-n-p type transistors for the n-p-n type presently used. In that no power silicon transistors of the p-n-p type are presently available, this would necessitate the use of p-n-p power germanium transistors. It has been found, however, that p-n-p power germanium transistors have characteristics which vary widely with changes in temperature and, accordingly, their use is preferably avoided where possible. It should also be noted that the negative polarity requirement could be satisfied by using the device of FIG. 2 by disconnecting the input and output terminals 11 and 18 from ground and by connecting the output terminal 16 to ground. There are, however, instances when it is required to connect more than one regulator across the points 10 and 11 of the unregulated direct-current source 12. In cases where the polarity of the devices differed, the regulating apparatuses could not be connected across the same unregulated source 12.

Referring now to FIG. 3, an apparatus is shown which resolves the above problems in accordance with the present invention for producing a negative polarity output voltage with an apparatus employing power silicon transistors. This apparatus comprises an unregulated direct-current source 75 which provides a first unregulated output of which is applied to an input terminal 76; a second unregulated output voltage of the order of −60 volts relative to ground which output is applied to an input terminal 77; and a third output which is at ground potential and connected to an input terminal 78. The input terminal 78, as in the case of input terminal 11, is connected to ground. The input terminal 77 is connected through resistor 14 to the input of the series regulator 15 and is serially connected through resistors 34, 35 to ground to provide the voltage divider network for biasing the overload transistor. The overload circuit includes an n-p-n type transistor 80 which has a base 81, a collector 82 and an emitter 83, which emitter 83 is connected to the junction between resistors 34 and 35. Unlike the overload transistor 26 in the apparatus of FIG. 2, the overload transistor 80 in the apparatus of FIG. 3 is biased so as to remain in a normally open position during non-overload conditions. The resistors 30, 31, 32 which provide the "keep-off" circuit are serially connected in the order named from the junction between resistor 14 and series regulator 15 to the output of series regulator 15. In addition, the junction between resistors 30 and 31 is connected to the base 81 of transistor 80 whereby the impedance $R_L$ of resistor 17 determines the bias applied to transistor 80 during the keep-off intervals. Lastly, the collector 82 is connected over a lead 85 to the control input of series regulator 15 along with the output of difference amplifier 20.

Series regulator 15 includes n-p-n type transistors 86, 87 having emitters 88, 89, collectors 90, 91 and bases 92, 93, respectively. The emitters 88, 89 are connected, respectively, through resistors 94, 14 and to the input terminal 77. Resistor 94 is selected to have the same resistance as current sensing resistor 14 whereby the resistors 14, 94 serve to maintain current flow evenly divided between the two transistors 86, 87. The collectors 90, 91 of transistors 86, 87, on the other hand, are connected to a junction 95, which junction is connected to the output terminal 16 and the bases 92, 93 are both connected to a common junction 96. In addition to the foregoing, current regulator 15 includes current amplifying transistors 97, 98 having emitters 99, 100, collectors 101, 102 and bases 103, 104, respectively. The emitter 99 of transistor 97 is connected to the junction 96; the collectors 101, 102 are both connected to the junction 95; and the base 103 of transistor 97 is connected through a Zener diode 105 to the emitter 100 of transistor 98. Lastly, the base 104 of transistor 98 is connected over the lead 85 to the collector 82 of the overload transistor 80 and to the output of the difference amplifier 20. The reference voltage source 24 in the difference amplifier 20 is similar to the apparatus of FIG. 2 with the exception that they are modified to operate from a negative polarity voltage rather than a positive polarity voltage as in the case of FIG. 2. Also, in operation, the difference amplifier 20 is not connected in a manner to be switched on and off as in the case of the apparatus described in connection with FIGS. 1 and 2. In the apparatus of FIG. 3, an output transistor 109 of the difference amplifier 20 receives current through a diode 106 which is connected to the junction between a resistor 107 and a Zener diode 108 which are, in turn, connected serially in the order named from the input terminal 76 to the output terminal 16. The diode 106 is polarized in a manner to allow current to normally flow away from the difference amplifier 20.

In operation, the overload transistor 80 is normally open, thus presenting a high impedance to the remainder of the apparatus and, accordingly, having little effect on its operation. The difference amplifier 20 therefore senses changes in output voltage relative to the reference voltage provided by reference voltage source 24 and produces a control signal which is applied to the base 104 of transistor 98 in a manner to minimize variations in output voltage. When an overload current flows through the resistors 14, 94, however, the increase in voltage developed thereacross is applied to the base 81 relative to the emitter 83 of overload transistor 80. This causes transistor 80 to switch from an open condition to a saturated condition, thereby diverting current which normally flows into the base 104 of transistor 98 of the series regulator 15 over lead 85 through transistor 80 and resistor 34 to the −60 volt source at input terminal 77. As this current is normally needed to cause the series regulator 15 to conduct, it now turns off. Zener diode 105 is used to insure proper shunting of the aforementioned current by overload transistor 80 by providing a high impedance to this same current as long as the potential available between emitter 100 and base 103 is insufficient to cause "Zener breakdown" of Zener diode 105. Thus, when shunted, series regulator 15 ceases to conduct and the voltage at the output drops to substantially zero.

As in the device of FIG. 2, non-conduction of series regulator 15 allows the "trickle" current through "keep-off" resistor 30, 31, 32 of resistances $R_2$, $R_3$ and $R_4$, respectively, and resistor 17 of resistance $R_L$ to increase to approximately 100 milliamperes. The resistors 30, 31, 32 and 17 form a resistor dividing network which biases transistor 80 in a manner to keep it "saturated" so long as the resistance $R_L$ of resistor 17 remains below a predetermined value corresponding to the initial overload current. As before, this value is determined by the selection of resistors 14, 30, 31, 32, 34 and 35, and may be set more precisely by adjusting the resistance $R_4$ of resistor 32. It is noted that when the regulator shuts down due to an overload there are two possible sources of current which could negate the effect of overload transistor 80 or, at least, impose severe current requirements on it. One possible source of current is through Zener diode 108, and the other through transistor 109. Transistor 109 is maintained in the "open" state during overload condition in spite of adequate source voltage which is present on lead 85 in that transistors 110, 111 of difference amplifier 20 have little or no source voltage and therefore cannot supply base current to transistor 109. The result is that only leakage currents of low magnitude flow through transistor 109 which currents are easily shunted through overload transistor 80. Zener diode 108 is kept from becoming a source of current during the "overload" condition by the action of diode 106 which becomes highly back-biased.

Typical voltages during normal and overload operating conditions of the device of FIG. 3 are as follows:

| Point | Normal, volts | Overload, volts |
|---|---|---|
| Input Terminal 77 | −60 | −60 |
| Input Terminal 76 | −120 | −120 |
| Input Terminal 78 | 0 | 0 |
| Junction between Resistor 107 and Zener diode 108 | −58 | −18 |
| Emitter 83 of Transistor 80 | −59 | −59 |
| Collector 82 of Transistor 80 | −54.5 | −58.5 |
| Base 81 of Transistor 80 | −59.5 | −59.5 |
| Input to Series Regulator 15 | −59.5 | −60 |
| Output Terminal 16 | −40 | 0 |

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. A voltage-regulated supply comprising first and second input terminals adapted to be responsive to a source of unregulated direct-current power of positive polarity, said second input terminal being connected to a first junction maintained at a first reference potential that is negative with respect to the potential of said first input terminal; first and second output terminals adapted to be connected across an output load impedance, said second output terminal being connected to said first junction; a current sensing resistor and a series regulator serially connected in the order named from said first input terminal to said first output terminal, said series regulator having a control input terminal; means for providing a second reference potential different from said first reference potential; a difference amplifier having an output coupled to said control input terminal of said series regulator and responsive to said second reference potential and to the voltage appearing at said first output terminal for controlling the flow of current through said series regulator; means including an overcurrent transistor connected to provide at least a portion of the current for said difference amplifier and responsive to the voltage drop across said current sensing resistor for changing the state thereof from saturated to open thereby to switch off current flow to said difference amplifier in response to a current flow in excess of a predetermined current through said current sensing resistor and thereby switch off current flow through said series regulator; and a resistor dividing network connected in shunt with said series regulator and having an intermediate junction thereof connected to said overcurrent transistor for maintaining said overcurrent transistor in an open condition thereby to maintain current flow to said difference amplifier switched off until a current less than said predetermined current would flow through said current sensing resistor.

2. The voltage-regulated supply as defined in claim 1 wherein said means including an overcurrent transistor connected to provide at least a portion of the current for said difference amplifier comprises a p-n-p transistor having a base, an emitter and a collector, said emitter being connected to said intermediate junction of said resistor dividing network and said collector being connected to said difference amplifier, and an additional resistor dividing network connected from said first input terminal to said second input terminal and having an intermediate junction connected to said base thereby to normally bias said p-n-p transistor in a saturated condition.

3. A voltage-regulated power supply comprising first and second input terminals adapted to be responsive to a source of unregulated direct-current power, said second input terminal being connected to a first junction maintained at a first reference potential; first and second output terminals adapted to be connected across an output load impedance, said second output terminal being connected to said first junction; a current sensing resistor and a series regulator connected in series from said first input terminal to said first output terminal, said series regulator having a control input terminal; means for providing a second reference potential different from said first reference potential; means coupled to said control input terminal of said series regulator and responsive to said second reference potential and to the voltage appearing at said first output terminal for controlling the flow of current through said series regulator; overcurrent means responsive to the voltage drop across said current sensing resistor and coupled to said series regulator, said overcurrent means including a p-n-p transistor having a base, a collector and an emitter, and a first resistor dividing network connected from said first to said second input terminals and having an intermediate junction connected to said base thereby to bias said transistor in a normally saturated condition for switching said series regulator off in response to a predetermined flow of current therethrough; and means including a second resistor dividing network connected in shunt with at least said series regulator and having an intermediate junction thereof connected to said emitter of said p-n-p transistor for continually maintaining said series regulator in a switched off condition until a current less than said predetermined flow of current would flow therethrough.

References Cited by the Examiner

UNITED STATES PATENTS

| | | |
|---|---|---|
| 2,915,693 | 12/59 | Harrison. |
| 2,974,270 | 3/61 | Christiansen. |
| 2,981,884 | 4/61 | Tighe. |
| 2,994,029 | 7/61 | Bixby. |
| 3,074,006 | 1/63 | Klees. |
| 3,131,344 | 4/64 | Rosenfeld et al. _____ 323—22 |

LLOYD McCOLLUM, *Primary Examiner.*

MILTON O. HIRSHFIELD, *Examiner.*

UNITED STATES PATENT OFFICE
CERTIFICATE OF CORRECTION

Patent No. 3,201,680                      August 17, 196

Erno H. Ross et al.

It is hereby certified that error appears in the above numbered patent requiring correction and that the said Letters Patent should read as corrected below.

Column 4, line 73, after "output" insert -- of the ord of -120 volts relative to ground, the output --.

Signed and sealed this 8th day of March 1966.

(SEAL)
Attest:

ERNEST W. SWIDER                      EDWARD J. BRENNE
Attesting Officer                      Commissioner of Patent